United States Patent
Wittenbreder, Jr.

(10) Patent No.: US 6,856,522 B1
(45) Date of Patent: Feb. 15, 2005

(54) SYNCHRONOUS RECTIFIER GATE DRIVE CIRCUITS FOR ZERO VOLTAGE SWITCHING POWER CONVERTERS

(75) Inventor: Ernest Henry Wittenbreder, Jr., Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 0 days.

(21) Appl. No.: 10/662,692

(22) Filed: Sep. 13, 2003

(51) Int. Cl.[7] ............................................. H02M 3/335
(52) U.S. Cl. ......................... 363/21.01; 363/21.06; 363/21.14
(58) Field of Search .......................... 363/21.01, 21.02, 363/21.06, 21.14, 56.03, 56.05

(56) References Cited

U.S. PATENT DOCUMENTS

| | | | | |
|---|---|---|---|---|
| 4,891,532 A | * | 1/1990 | Shekhawat et al. | 327/483 |
| 5,038,267 A | * | 8/1991 | De Doncker et al. | 363/89 |
| 5,196,980 A | * | 3/1993 | Carson | 361/18 |
| 6,487,094 B1 | * | 11/2002 | Weng et al. | 363/21.12 |
| 6,650,553 B2 | * | 11/2003 | Tsai | 363/21.07 |
| 6,687,141 B2 | * | 2/2004 | Odell | 363/56.11 |
| 6,760,235 B2 | * | 7/2004 | Lin et al. | 363/21.06 |

* cited by examiner

Primary Examiner—Bao Q. Vu

(57) ABSTRACT

Synchronous rectifier gate drive mechanisms are revealed which are universally applicable to zero voltage switching power converters which rely on an auxiliary inductor to drive the critical turn on transition of the main switch of the power converter. One of the gate drive mechanisms revealed can also be used to improve the ZVS load range of the converter and to increase the power capability of the converter. Voltage limiting circuits that clamp the gate voltage of a synchronous rectifier during the turn off transition of the synchronous rectifier, preventing inadvertent turn on of the synchronous rectifier, are revealed.

18 Claims, 14 Drawing Sheets

SYNCHRONOUS RECTIFIER GATE DRIVE CIRCUITS FOR ZERO VOLTAGE SWITCHING POWER CONVERTERS

BACKGROUND OF THE INVENTION

1. Field of the Invention

The subject invention generally pertains to electronic power conversion circuits, and more specifically to high frequency, switched mode power electronic converter circuits.

2. Description of Related Art

One significant source of power losses in high frequency power converters is gate drive loss. Some converters have the inherent ability to provide synchronous rectifier self gate drive which results in the recirculation of gate drive energy and easy synchronous rectifier gate drive. Without a self gate drive mechanism driver circuits are required and, in many cases, these driver circuits can be complex, costly, and inefficient. Also, the signals available and easily accessible often do not provide the proper timing or signal levels for synchronous rectifier gate drive.

In most cases a positive voltage is applied to the gate of an N channel power mosfet during the on state of the switch. The positive voltage should be sufficient to fully enhance the switch, but no more. Often a negative gate voltage is applied to the gate during the off state of the switch. The negative gate drive speeds up the turn off transition by increasing the current out of the gate during the transition, which serves to reduce turn off transition losses in the drain circuit.

U.S. patent application Ser. No. 10/157,101 revealed a gate drive mechanism for a synchronous rectifier, illustrated in FIG. 1, that relies on a signal from a small choke added to the power converter to provide energy for a zero voltage turn on transition of a main switch. The placement of transistors and diodes between the small choke and the gate of the synchronous rectifier served to provide optimal timing of the synchronous rectifier during the turn on transition so that the synchronous rectifier is turned on precisely as its drain to source voltage reaches zero volts. The wave forms for the FIG. 1 circuit are illustrated in FIG. 2. There is a mechanism that exists in the normal operation of the circuit that can inadvertently turn on the synchronous rectifier as its drain to source voltage rises at the beginning of the off state of the synchronous rectifier. The problem is illustrated in FIGS. 3(a) and 3(b). As the drain to source voltage of the synchronous rectifier rises there is a current that flows in the intrinsic gate drain capacitance of the mosfet. This current serves to charge the gate to source capacitance of the power mosfet, as illustrated in FIG. 3(b), which, if the gate to source voltage rises above the gate threshold voltage, will turn on the synchronous rectifier during its turn off transition, which may lead to catastrophic results. What is needed is a circuit mechanism that avoids this inadvertent turn of the synchronous rectifier and alternate methods for synchronous rectifier self gate drive that provide improvements to the operation of the power converter as a whole.

Objects and Advantages

An object of the subject invention is to provide a simple self gate drive mechanism for synchronous rectifiers which recirculates rather than dissipates gate drive energy for synchronous rectifiers.

Another object of the subject invention is to provide a circuit that prevents the inadvertent turn on of the synchronous rectifier due to gate charging from the gate drain capacitance during the turn off transition of the synchronous rectifier.

Another object of the subject invention is to provide a simple self gate drive mechanism that also extends the zero voltage switching (ZVS) range of the power converter, reduces component stresses, and generally improves the operating characteristics of the power converter.

Further objects and advantages of my invention will become apparent from a consideration of the drawings and ensuing description.

These and other objects of the invention are provided by novel circuit techniques that use the small inductor employed in many ZVS circuits to provide a synchronous rectifier self gate drive mechanism. Synchronous rectifier self gate drive is provided by coupling the same small inductor used to provide drive energy for ZVS to the gate of the synchronous rectifier. Alternatively, the self gate drive signal can be provided by a magnetically coupled winding of the same small inductor used to provide drive energy for ZVS. Alternatively, the self gate drive signal can be provided by a second small inductor that also provides energy to extend the zero voltage switching range at light loads which can also be used to reduce the duty cycle at maximum load.

SUMMARY

The subject invention uses a small value capacitor, diode, and transistor to clamp the gate of a synchronous rectifier during the synchronous rectifier's turn off transition. Alternatively, a small mosfet can replace the small value capacitor such that the intrinsic output capacitance of the small mosfet replaces the small value capacitor in such a way that the small capacitor's energy requirements are reduced. An alternative means of accomplishing synchronous rectifier self gate drive in a ZVS power converter is revealed that requires an extra small coupled inductor which can also serve to increase the ZVS load range and extend the power handling capability of the converter.

Description of the Preferred Embodiments

Figure 1:
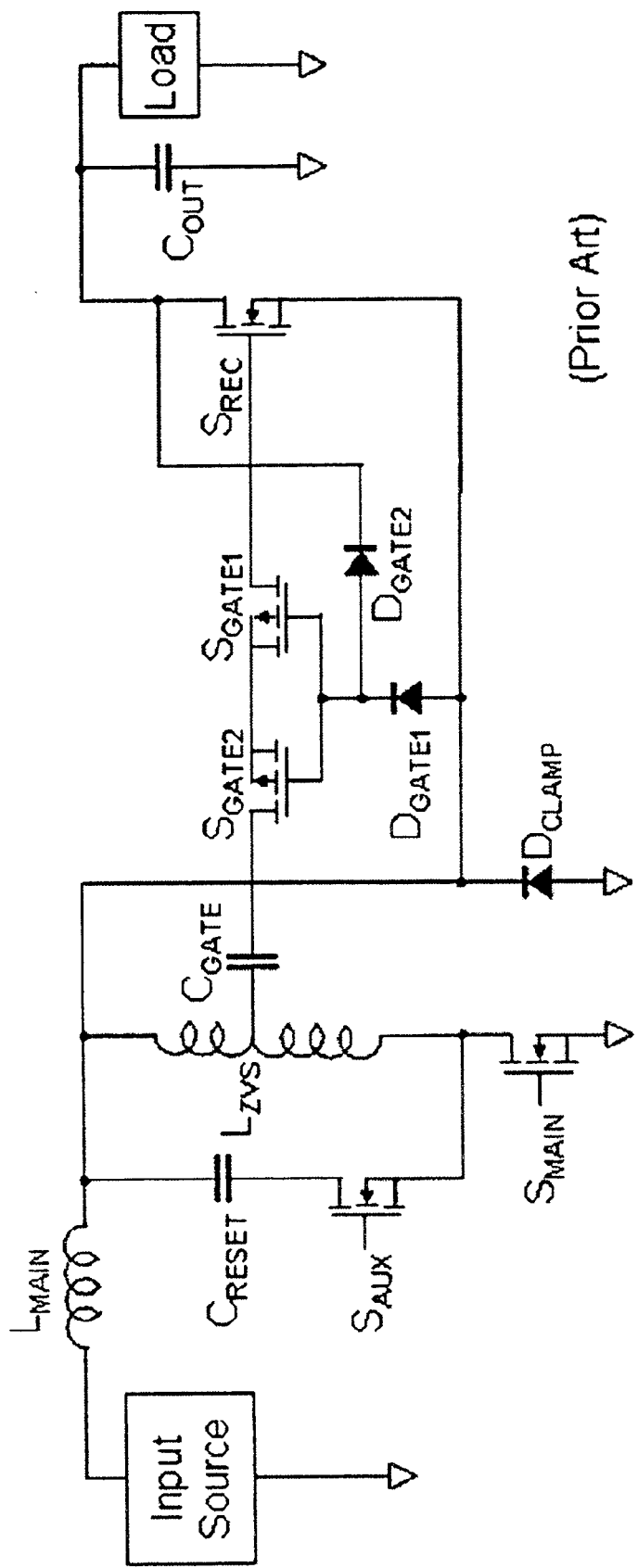
FIG. 1 illustrates a ZVS boost converter with synchronous rectifier self gate drive according to the prior art containing a ZVS drive inductor with a lead provided for connecting to the gate of a synchronous rectifier for synchronous rectifier self gate drive.
Figure 2:
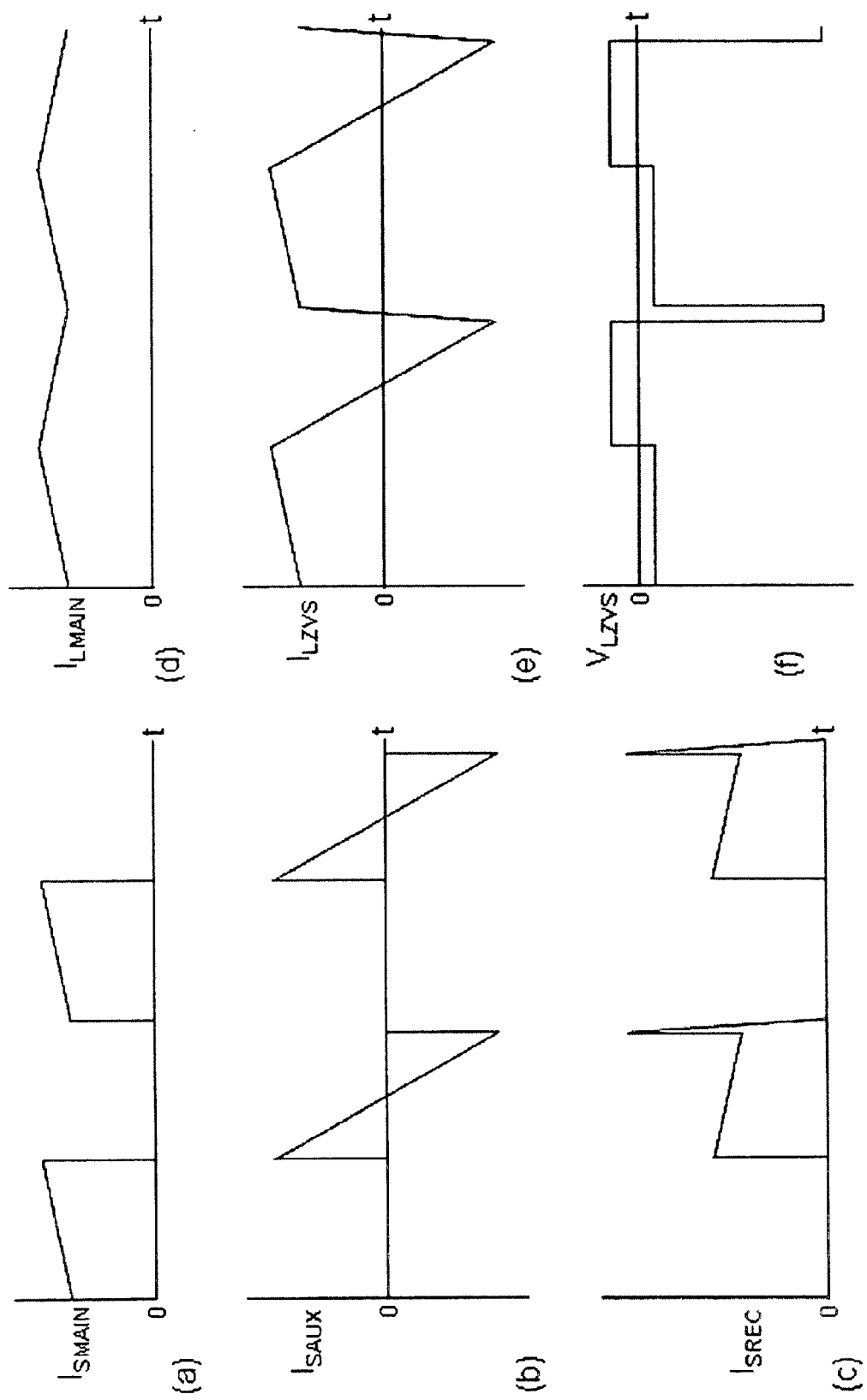
FIG. 2(a) illustrates the wave form of the main switch current of the FIG. 1 circuit.
FIG. 2(b) illustrates the wave form of the auxiliary switch current of the FIG. 1 circuit.
FIG. 2(c) illustrates the wave form of the synchronous rectifier current for the FIG. 1 circuit.
FIG. 2(d) illustrates the wave form of the main inductor current for the FIG. 1 circuit.
FIG. 2(e) illustrates the wave form of the ZVS drive inductor current for the FIG. 1 circuit.
FIG. 2(f) illustrates the wave form of the ZVS drive inductor voltage for the FIG. 1 circuit.
Figure 3:
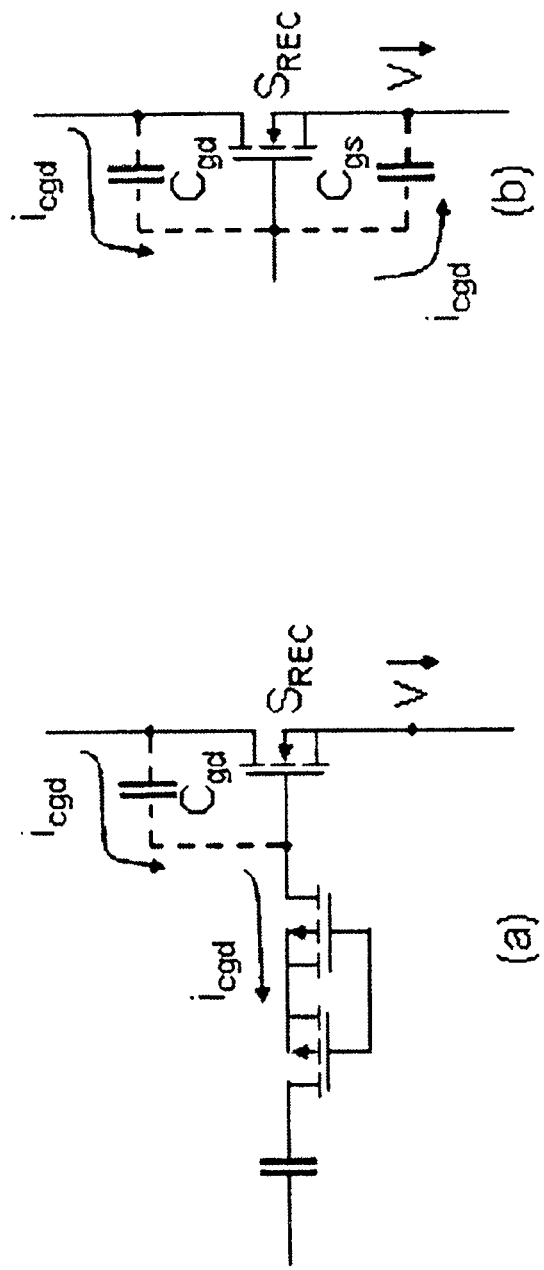
FIG. 3(a) illustrates the initial current path of the gate drain intrinsic capacitor of the synchronous rectifier during the turn off transition of the synchronous rectifier.
FIG. 3(b) illustrates the final current path of the gate drain intrinsic capacitor of the synchronous rectifier during the turn off transition of the synchronous rectifier.
Figure 4:
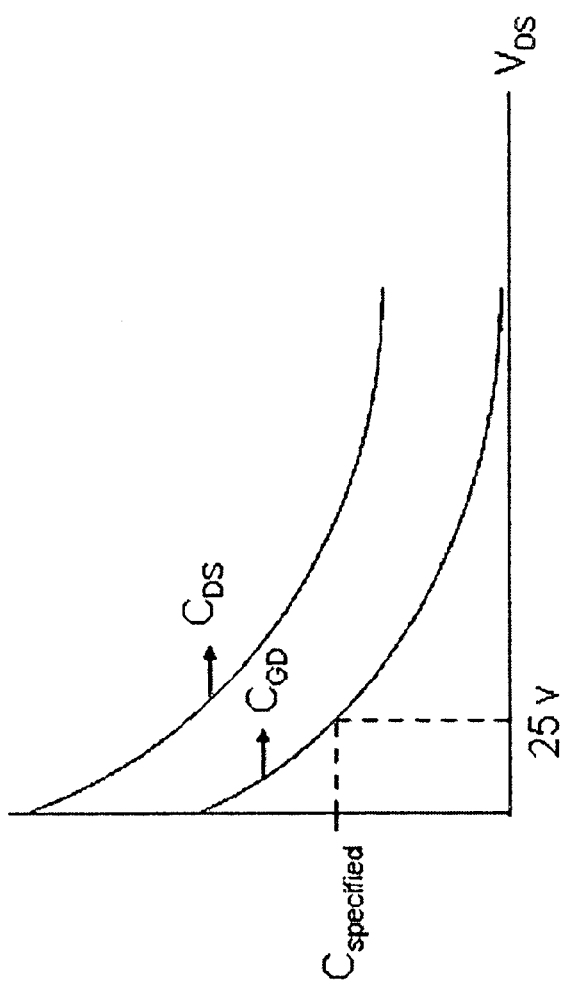
FIG. 4 illustrates typical gate drain capacitance and drain source capacitance as a function of drain to source voltage for a power mosfet.

FIG. 4 illustrates the dependency of the gate to drain and drain to source intrinsic capacitances of a power mosfet as a function of drain to source voltage. The gate to drain capacitance is often referred to as the Miller capacitance. It can be seen from FIG. 4 that the intrinsic capacitances fall in value as the drain to source voltage increases, and, for the case of the gate to drain capacitance, the capacitance diminishes almost to the point of elimination as the drain to source voltage rises. A current, during the turn off transition of the power mosfet, flows into the gate terminal of the power mosfet, as the drain to source voltage rises, due to the charging of the gate to drain capacitance. If there is no low impedance path provided for current to flow out of the gate or if the path for charge out of the gate is blocked by a high impedance, then it is possible that the current from the gate to drain capacitance can turn on the power mosfet during the turn off transition. The results of such an inadvertent turn on of the power mosfet during the off transition could be catastrophic.

Figure 5:
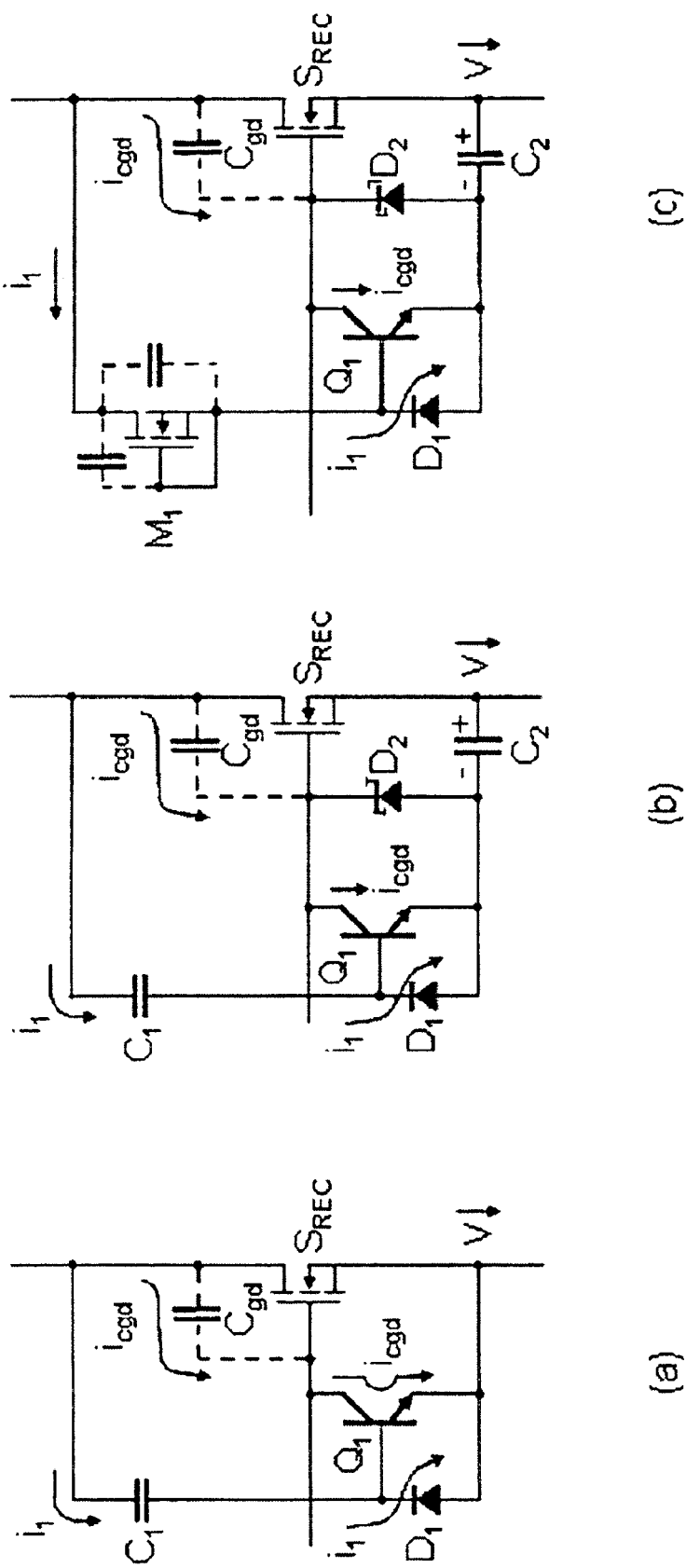
FIG. 5(a) illustrates the current path of the gate drain intrinsic capacitance according to one form of the subject invention.
FIG. 5(b) illustrates the current path of the gate drain intrinsic capacitance according to a second form of the subject invention.
FIG. 5(c) illustrates the current path of the gate drain intrinsic capacitance according to a third form of the subject invention.

FIG. 5(a) illustrates a circuit consisting of a capacitor $C_1$, a diode $D_1$, and a NPN bipolar transistor $Q_1$ which eliminates the problem of inadvertent turn on of the power mosfet $S_{REC}$ during its turn off transition. $C_1$ is connected with a first terminal connected to a drain terminal of the power mosfet synchronous rectifier $S_{REC}$. A second terminal of $C_1$ is connected to a base terminal of $Q_1$. A collector terminal of $Q_1$ is connected to a gate terminal of $S_{REC}$ and an emitter terminal of $Q_1$ is connected to a source terminal of $S_{REC}$. In this construction $Q_1$ is connected in the common emitter configuration which inverts the voltage applied to the base of the transistor at the collector of the transistor. As the drain to source voltage of the power mosfet $S_{REC}$ rises a current $i_1$ flows in the capacitor $C_1$, due to the charging of $C_1$, and $i_1$ flows into the base terminal of the NPN transistor $Q_1$, thereby forward biasing the base emitter junction of $Q_1$. $i_1$ flows into the base of $Q_1$, turning Q1 on thereby shorting the gate of $S_{REC}$ to the source of $S_{REC}$ and providing a path for the current, $i_{CGD}$, from the intrinsic gate to drain capacitance of $S_{REC}$ out of the gate terminal of $S_{REC}$, preventing the $S_{REC}$ gate voltage from rising and preventing $S_{REC}$ from turning on during its turn off switching transition. A current $i_1$ flows in $C_1$ only during the turn on and turn off transitions of $S_{REC}$. The transistor $Q_1$ is turned on only when an alternate path is needed for $i_{CGD}$. The diode $D_1$ conducts only during the turn on transition of $S_{REC}$, but has no effect on the operation of $S_{REC}$, except that $D_1$ positions the base voltage of $Q_1$ near its emitter voltage so that, when a turn off transition begins, the base voltage of $Q_1$ is positioned to turn $Q_1$ on as soon as the drain to source voltage of $S_{REC}$ begins to rise. The lead extending to the left of the gate of $S_{REC}$ and to the left of the collector of $Q_{GATE}$ connects to other electronic components used for providing a gate drive signal for $S_{REC}$. Because $Q_1$ has a substantial amount of current gain, the current $i_1$ can be much smaller than the current $i_{CGD}$, so that the capacitor $C_1$ can be small and have little or no impact on the operation of the circuit.

Related Embodiments

FIG. 5(b) illustrates an alternative arrangement of the subject invention applicable to the situation in which the gate of the power mosfet is driven negative to improve the turn off transition power losses in the drain circuit of $S_{REC}$. In FIG. 5(b) a diode $D_2$ and a capacitor $C_2$ are added to the FIG. 5(a) circuit. When the gate voltage of $S_{REC}$ reaches it most negative value the capacitor $C_2$ is charged to the most negative value of the gate voltage through diode $D_2$. The capacitor $C_2$ should be selected to be sufficiently large so that its voltage is invariant or nearly invariant. The voltage of $C_2$ will be held at the minimum or most negative voltage of the gate of $S_{REC}$. In FIG. 5(b) as the drain to source voltage of $S_{REC}$ rises the transistor $Q_1$ is turned on and the gate voltage is held at its most negative value which is the voltage applied to $C_2$.

FIG. 5(c) illustrates another variation of the subject invention in which the capacitor Ci is replaced by a small mosfet $M_1$. The mosfet $M_1$ has its gate connected to its source. $M_1$ appears to the circuit as a voltage variable capacitor since the intrinsic capacitances of $M_1$ decrease as the drain to source voltage of $M_1$ increases, as illustrated in FIG. 4. The capacitance variation with voltage of $M_1$ will be similar to the capacitance variation with voltage of the gate drain capacitance of $S_{REC}$, except that the capacitance of $M_1$ will be substantially smaller. $M_1$ will provide more base current to $Q_1$ when more base current is needed at the beginning of the turn off transition and less base current to $Q_1$ towards the end of the turn off transition when less base current is needed, which approaches the ideal situation. Also, mosfets are more easily implemented in silicon for integrated circuit applications than are pure capacitors, so that for an integrated circuit implementation of the solution proposed in the subject invention using a mosfet instead of a capacitor is advantageous.

Figure 9:
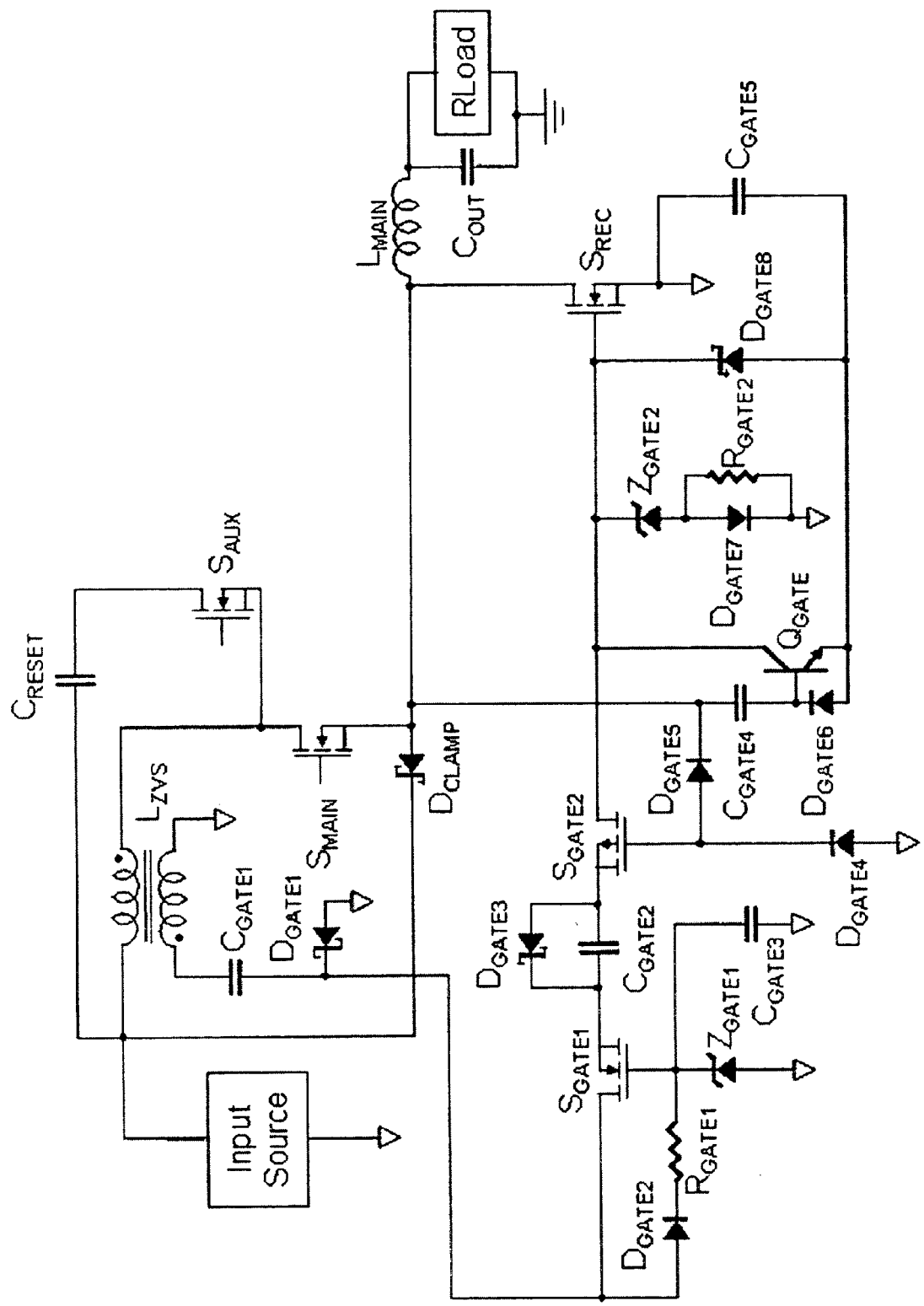
FIG. 9 illustrates a ZVS buck converter with synchronous rectifier self gate drive according to the subject invention.
Figure 10:
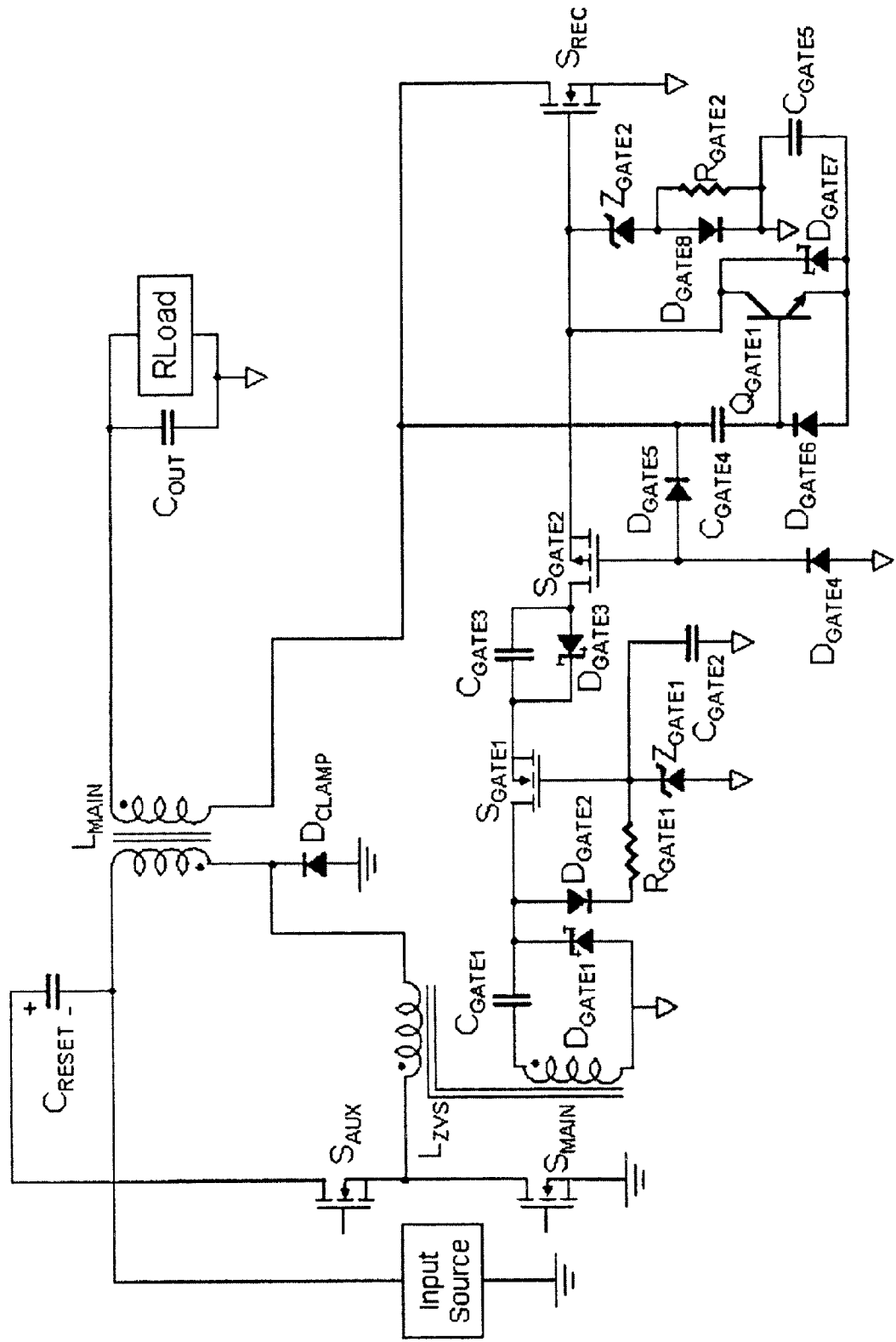
FIG. 10 illustrates a ZVS active clamp flyback converter with synchronous rectifier self gate drive according to the subject invention.

An example of the application of the FIG. 5(b) circuit to a ZVS synchronous rectifier buck converter is illustrated in FIG. 9. The reader is referred to U.S. Pat. No. 6,411,153 for a detailed description of the operation of the ZVS synchronous rectifier buck converter. In the FIG. 9 circuit the N channel mosfet $S_{GATE1}$ serves to limit the peak-to-peak voltage swing of the gate of $S_{REC}$. The P channel mosfet $S_{GATE2}$ serves to delay the turn on of $S_{REC}$ until its drain to source voltage has dropped to zero, thereby providing optimal timing for a ZVS turn on transition. $C_{GATE4}$, $D_{GATE6}$, $D_{GATE8}$, $C_{GATE5}$, and $Q_{GATE}$ serve to hold the gate of $S_{REC}$ at its negative peak voltage, thereby preventing inadvertent turn on of $S_{REC}$ during its turn off transition due to current in the gate drain capacitance of $S_{REC}$. FIG. 10 illustrates a ZVS active clamp flyback converter (U.S. Pat. No. 5,402, 329) with synchronous rectifier self gate drive accomplished in the same manner as the synchronous rectifier self gate drive of FIG. 9.

Figure 11:
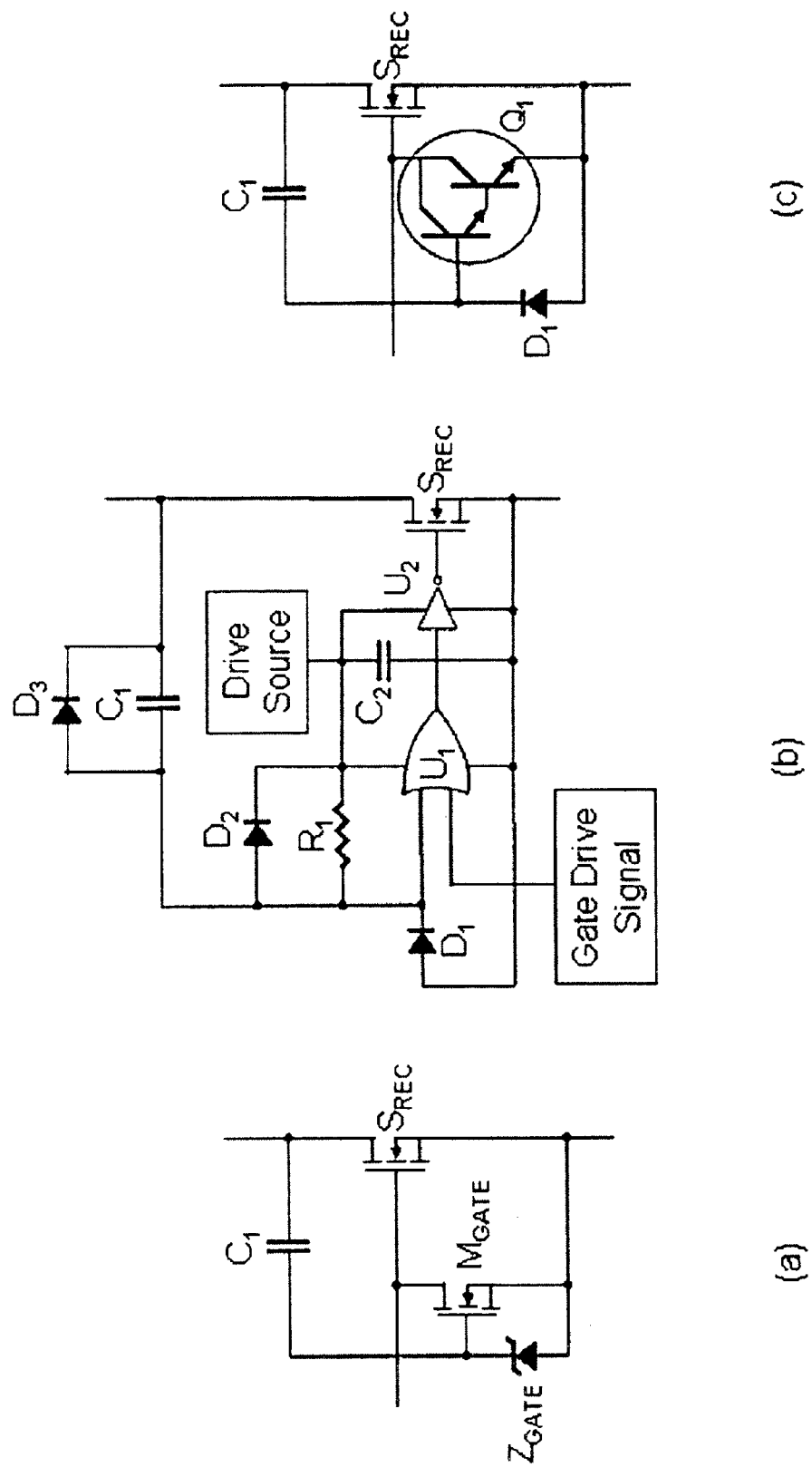
FIG. 11(a) illustrates an alternate method of implementing the subject invention using a small signal mosfet to clamp the gate source voltage of the synchronous rectifier.
FIG. 11(b) illustrates another alternate method of implementing the subject invention relying on a simple logic gate and inverting driver to accomplish the needed gate clamping. This circuit also provides optimal turn on timing for the synchronous rectifier.
FIG. 11(c) illustrates another alternate method of implementing the subject invention relying on a darlington transistor to accomplish the inversion and gate clamping.

FIG. 11(a) illustrates another embodiment of the subject invention with a N channel mosfet $M_{GATE}$ replacing the NPN bipolar transistor $Q_1$ of FIG. 5(a) and a zener diode $Z_{GATE}$ replacing the rectifier diode $D_1$. There are some minor differences in operation of the FIG. 11(a) circuit in comparison to the FIG. 5(a) circuit, but both circuits can effectively clamp the gate voltage of $S_{REC}$ during the turn off transition of $S_{REC}$. In FIG. 11(a) the mosfet $M_{GATE}$ turns on when its gate voltage rises to the level of its gate threshold voltage, but in FIG. 5(a) $Q_1$ turns on when its base voltage rises to the level of its base emitter junction forward bias voltage. Another more significant difference is that after the turn off transition when current has stopped flowing in $C_1$ the transistor $Q_1$ in FIG. 5(a) turns off while in the FIG. 11(a) circuit the mosfet $M_{GATE}$ remains on until the drain to source voltage of $S_{REC}$ begins to fall. Another difference is that the base voltage of $Q_1$ in FIG. 5(a) is clamped by the base emitter forward voltage of $Q_1$ while in FIG. 11(a) the gate voltage of $M_{GATE}$ is clamped by the zener diode $Z_{GATE}$. If the FIG. 11(a) circuit is used with a negative gate drive then the body diode of $M_{GATE}$ obviates the diode $D_2$ of FIG. 5(b).

FIG. 11(b) illustrates another related embodiment of the subject invention. In FIG. 11(b) the capacitor $C_1$ serves the same function as it does in the previously described embodiments. Diodes $D_1$ and $D_2$ clamp the voltage of the top input of the OR gate $U_1$ to the supply voltage range of $U_1$. $D_3$ is used to provide optimal turn on timing for $S_{REC}$ since the gate of $S_{REC}$ is held low (off) until the drain source voltage of $S_{REC}$ applies a low logic signal to the top input of the OR gate $U_1$ through the diode $D_3$. $U_2$ is an inverting driver integrated circuit. When a turn off transition of $S_{REC}$ begins the top input of $U_1$ is pulled high by $C_1$ which forces the output of $U_1$ high and the output of $U_2$ low, thereby holding $S_{REC}$ off during the turn off transition. A gate drive signal must be applied to the bottom input of $U_1$ to initiate the gate turn off transition for $S_{REC}$.

FIG. 11(c) illustrates another related embodiment of the subject invention. FIG. 11(c) is identical to FIG. 5(a) except that the $Q_1$ transistor of FIG. 11(c) is a darlington transistor. The advantage of the darlington transistor is that less base current is needed to turn $Q_1$ on, so that an even smaller $C_1$ is needed.

Description of the Preferred Embodiments

Figure 6:
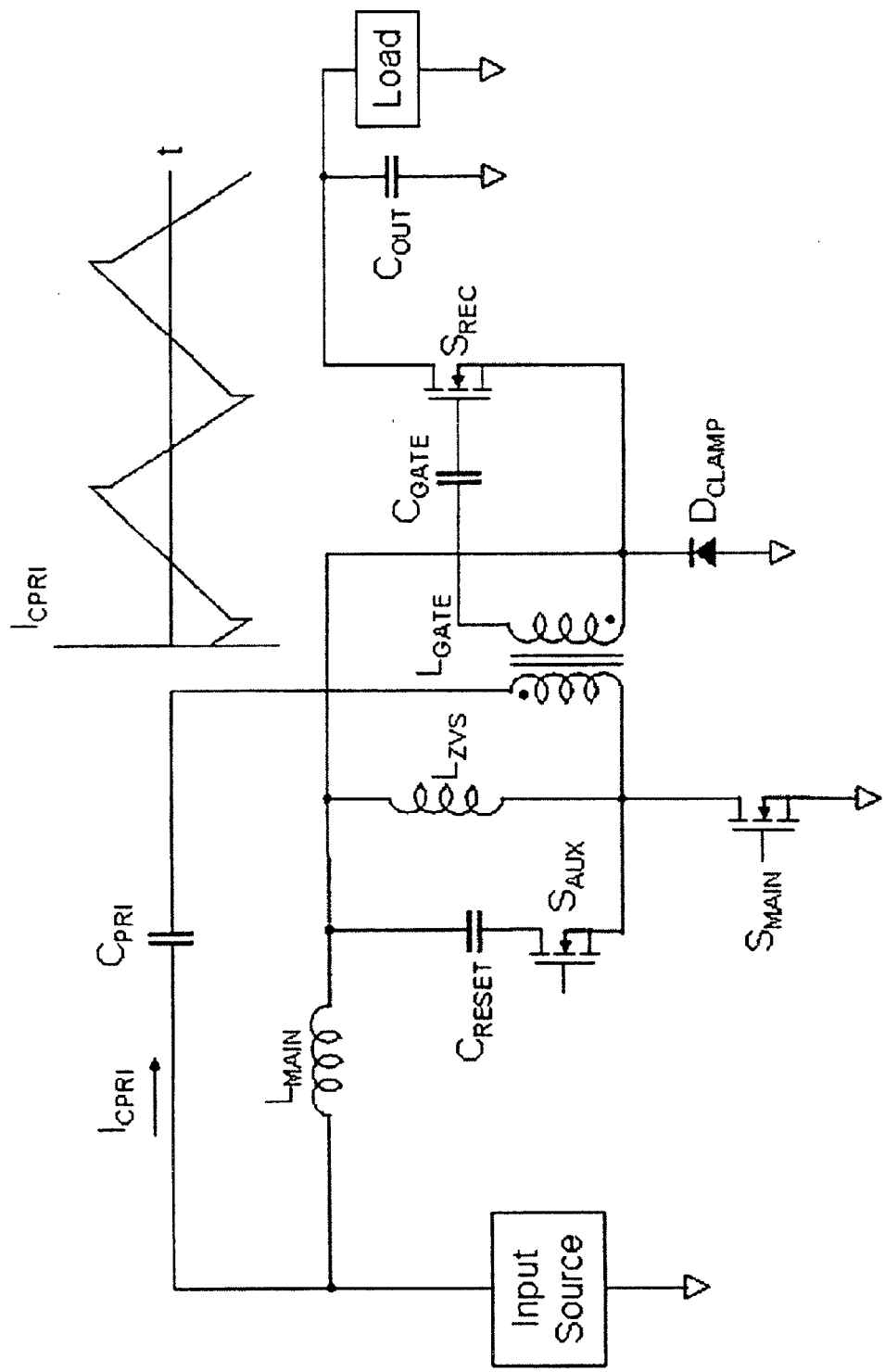
FIG. 6 illustrates an alternate gate drive mechanism for a synchronous rectifier in a ZVS boost converter according to the subject invention.

FIG. 6 illustrates an alternative method of accomplishing synchronous rectifier self gate drive in a ZVS boost converter (U.S. Pat. No. 6,411,153). The technique illustrated in FIG. 6 is generally applicable to other converter types. Instead of deriving a gate drive signal from the series connected ZVS drive choke, a signal is derived from a separate parallel ac connected coupled inductor connected at the juncture of the main switch and an active reset switch. The disadvantages to this approach are the additional magnetic circuit element and the coupling capacitor. In this new approach a capacitor $C_{PRI}$ is connected to the input dc source and in series with a primary winding of a coupled inductor $L_{GATE}$. A secondary winding of $L_{GATE}$ is coupled to the gate of a synchronous rectifier $S_{REC}$ in order to provide a properly timed gate drive signal and energy for driving $S_{REC}$. Srec is turned off with the turn on of $S_{MAIN}$. $S_{REC}$ is turned on with the turn on of $S_{AUX}$, as desired. $S_{REC}$ is turned off during the turn on transition of $S_{MAIN}$, which forces the current flowing in $S_{REC}$ into the body diode of $S_{REC}$. The current in the body diode of $S_{REC}$ is ramped down gradually because of the presence of $L_{ZVS}$ thereby largely eliminating reverse recovery effects of the body diode of $S_{REC}$, which would otherwise be a problem and a source of substantial switching losses if the converter were not a soft switching converter type. There are several performance advantages to this approach. The peak-to-peak voltage swing of the gate drive signal at the secondary of $L_{GATE}$ is dependent on the regulated output voltage of the boost converter and the turns ratio of $L_{GATE}$, but independent of the load current and the line voltage, whereas a gate drive signal derived from $L_{ZVS}$ will be dependent on both the load current and the line voltage, so the new approach revealed in FIG. 6 provides a more consistent and less variable drive voltage and, thereby, it is more consistent and easier to implement. Also, with the gate drive signal derived from the $L_{ZVS}$ choke additional circuitry to ensure that the gate of the synchronous rectifier was not enhanced during the turn off transition was required, in many cases, due to the timing of the gate drive signal from the $L_{ZVS}$ choke which rises up during the turn off transition of the synchronous rectifier. There is no similar requirement for the mechanism revealed in FIG. 6, since the timing and wave shape are such that the gate drive signal remains low throughout the turn off transition of the synchronous rectifier, thereby providing a path for current flow away from the gate of the synchronous rectifier during the turn off transition without extra circuit used expressly for that purpose. Also, there are other benefits that can be derived from the use of the $L_{GATE}$ choke. The ac current that flows in the primary winding of $L_{GATE}$ is directed in such a way as to provide additional current for the ZVS switching transitions during light load conditions. The ac current component in $L_{MAIN}$ can be increased by reducing the inductance of $L_{MAIN}$ with the same effect, but an increased ac current in $L_{MAIN}$ results in a higher peak current in $L_{ZVS}$ resulting in higher voltage stress for both $S_{MAIN}$ and $S_{AUX}$, which negatively impacts the maximum load capability of the converter.

Related Embodiments

Figure 7:
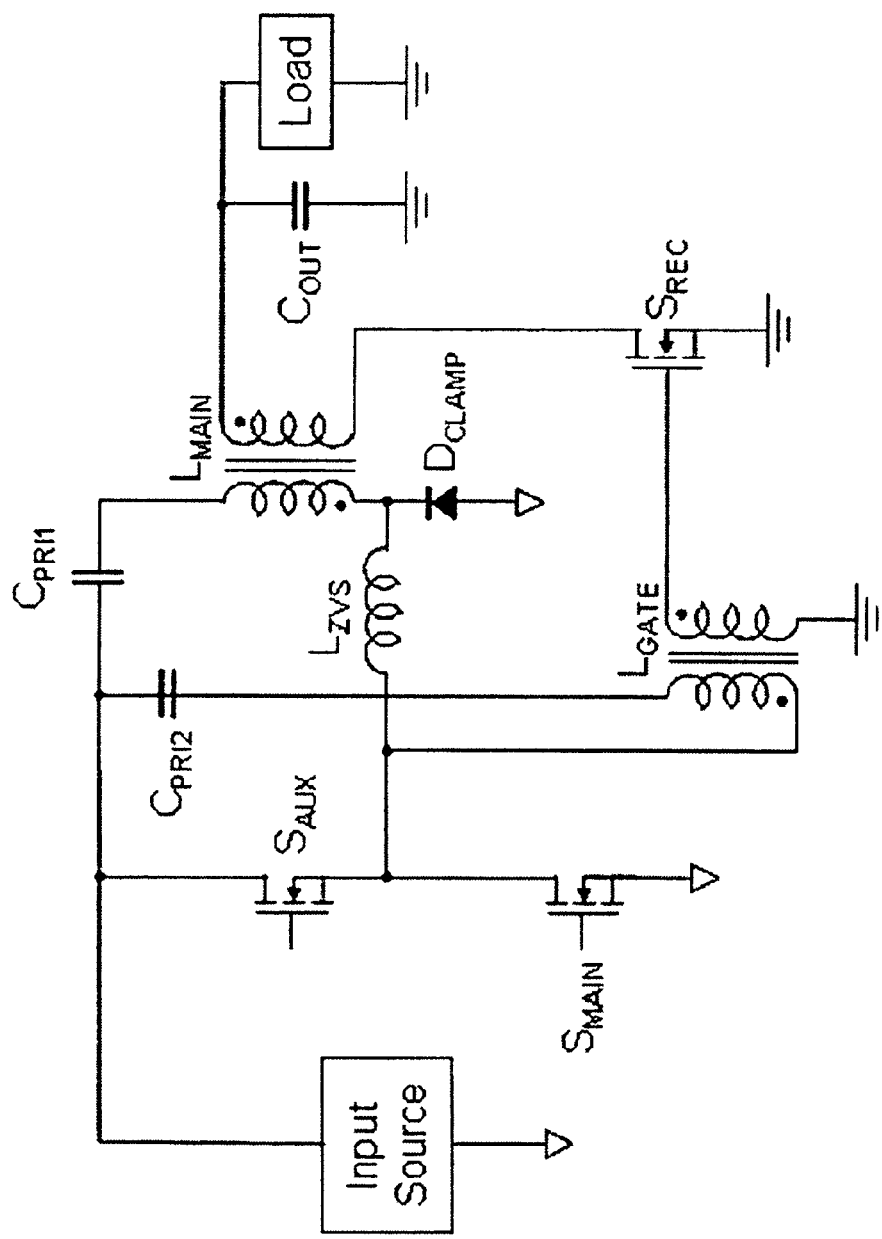
FIG. 7 illustrates the alternate gate drive mechanism applied to a ZVS asymmetrical half bridge coupled inductor buck converter according to the subject invention.
Figure 8:
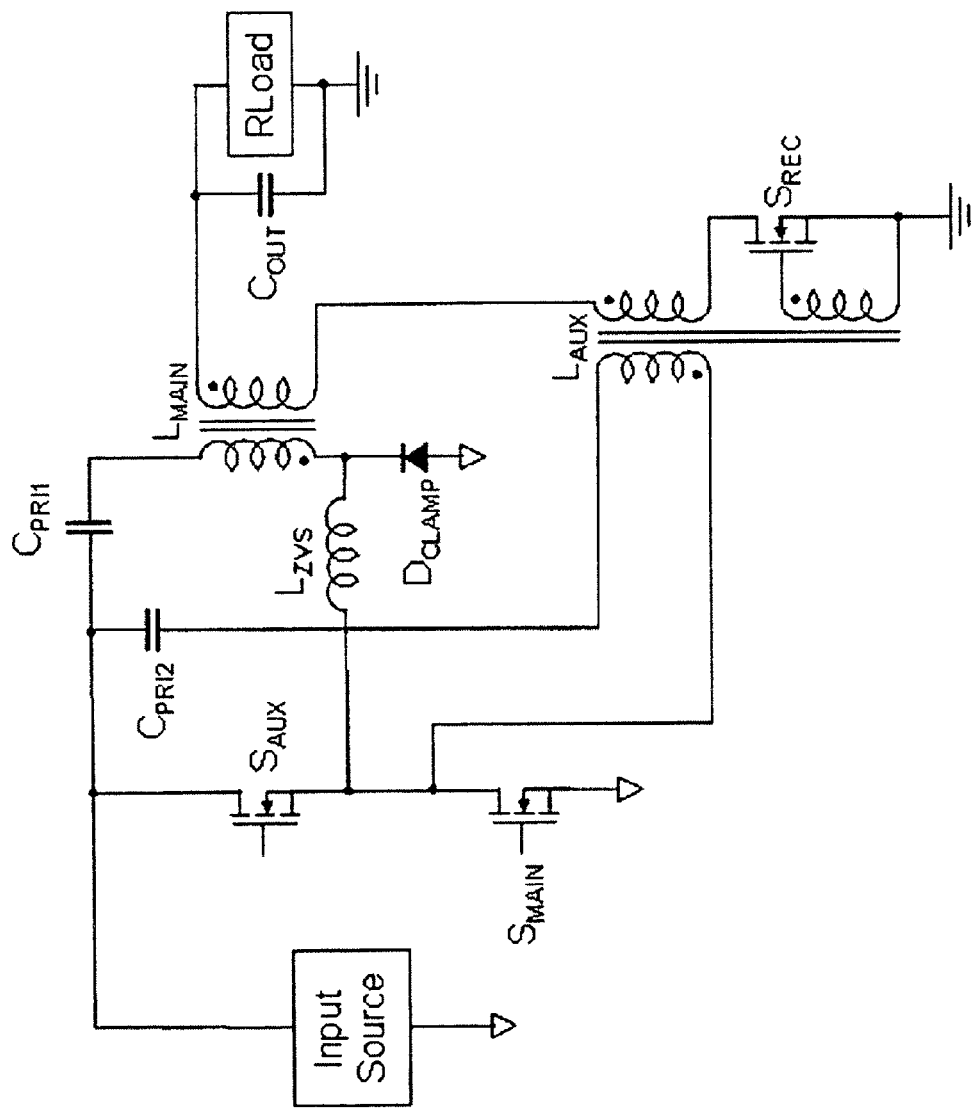
FIG. 8 illustrates a ZVS asymmetrical half bridge coupled inductor buck converter with synchronous rectifier self gate drive and a novel duty cycle reduction mechanism according to the subject invention.

FIG. 7 illustrates the same circuit mechanism revealed in FIG. 6, but applied instead to a ZVS asymmetrical half bridge coupled inductor buck converter (U.S. Pat. No. 5,402,329). One minor difference is that the gate signal to the synchronous rectifier is ac coupled in FIG. 6 but dc coupled in FIG. 7. In both cases the gate drive signal is derived from the junction of a main switch and an auxiliary switch that operate in anti-synchronization. A variation of the FIG. 7 circuit is revealed in FIG. 8. The FIG. 8 circuit adds a second secondary winding to the $L_{AUX}$ choke, placed in series with the secondary winding of $L_{MAIN}$. The second secondary winding of $L_{AUX}$ is used to provide a small fraction of the output voltage and power to the load. With the addition of the second $L_{AUX}$ secondary winding in series with the secondary winding of $L_{MAIN}$ the voltage required of the secondary winding of $L_{MAIN}$ is reduced and the duty cycle required to maintain the output voltage is also reduced. The fraction of the output voltage and output power provided by the second secondary winding of $L_{AUX}$ increases as the load increases. The addition of the second secondary winding of $L_{AUX}$, placed as illustrated in FIG. 8, has the effect of reducing the duty cycle required at any given load, which effectively extends the operating range of the converter to higher loads. Since this converter is often duty cycle limited at maximum load, reducing the duty cycle can be a significant benefit. Compared to $L_{MAIN}$ the primary to secondary turns ratio of $L_{AUX}$ is considerably larger for the winding in the output current path, otherwise the ZVS properties of the converter will be compromised at high load. In the FIG. 8 circuit $L_{AUX}$ provides synchronous rectifier self gate drive, improved light load ZVS range, and reduced duty cycle which results in extended maximum load range.

Description of the Preferred Embodiments

Figure 12:
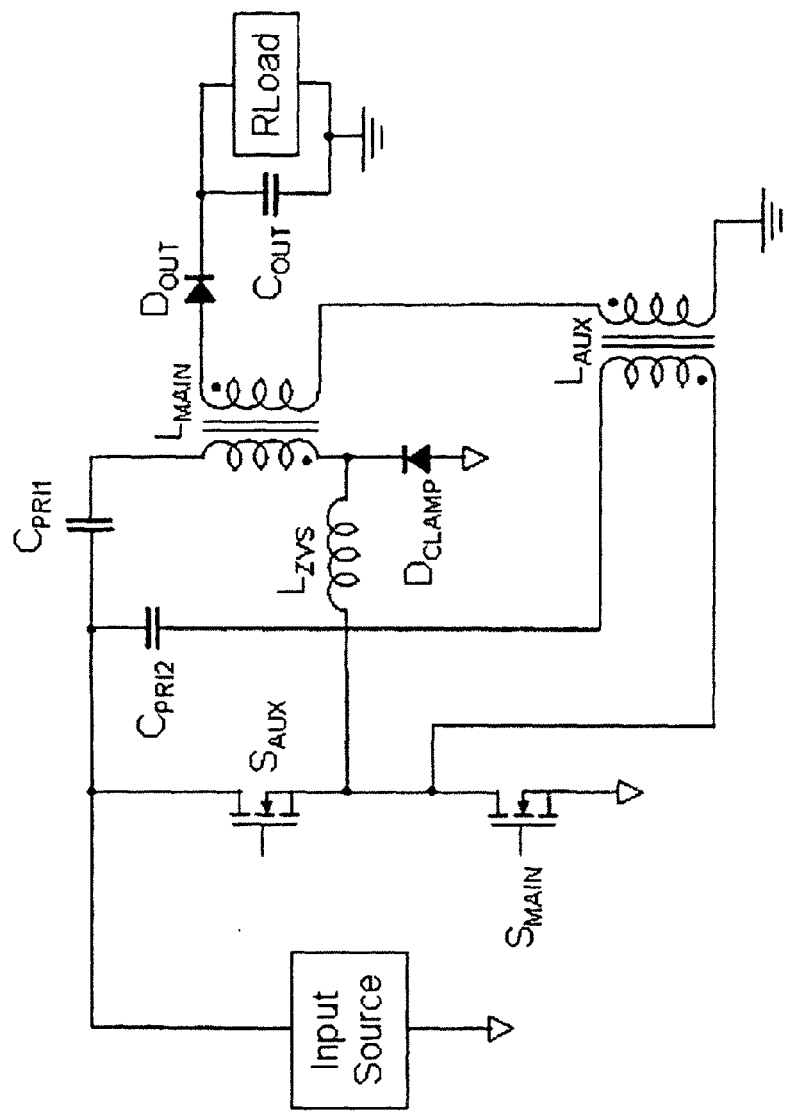
FIG. 12 illustrates how a small coupled inductor can be used to improve the ZVS load range and extend the maximum load capability of a ZVS asymmetrical half bridge coupled inductor buck converter according to the subject invention.

FIG. 12 illustrates a ZVS asymmetrical half bridge coupled inductor buck converter (U.S. Pat. No. 5,402,329) with an auxiliary choke $L_{AUX}$, not revealed in the '329 patent, that operates in parallel with the main coupled inductor $L_{MAIN}$ on the primary side, but in series with the main coupled inductor $L_{MAIN}$ on the secondary side. The structure of the power converter circuit is as described in U.S. Pat. No. 5,402,329 FIG. 5, except with the following additions. A primary winding of $L_{AUX}$ is connected with a dotted terminal of $L_{AUX}$ connected to a drain terminal of $S_{MAIN}$ and an undotted terminal of $L_{AUX}$ connected to a first terminal of a capacitor $C_{PRI2}$. A second terminal of capacitor $C_{PRI2}$ is connected to a dc input source. A dotted terminal of a secondary winding of $L_{AUX}$ is connected to an undotted terminal of coupled inductor $L_{MAIN}$. An undotted terminal of the secondary winding of $L_{AUX}$ is connected to the load. The addition of the $L_{AUX}$ coupled inductor on the primary side increases the ac switch current, due to the magnetizing current of $L_{AUX}$, and the drive energy available for zero voltage switching transitions at zero or light loads, thereby extending the zero voltage switching range of the converter. At heavy loads there is ample energy provided by $L_{ZVS}$ to drive the critical zero voltage turn on transition of the switch $S_{MAIN}$. $L_{AUX}$ should be designed with a relatively large gap so that there will be ample energy available to drive the zero voltage switching transitions at light load and so that the peak-to-peak magnetizing current swing is sufficiently large that the current reverses each cycle at all loads. Large magnetizing current swings are generally undesirable for the main magnetic but since only a small fraction of the power is transferred through $L_{AUX}$ the relatively large magnetizing current swing of $L_{AUX}$ is inconsequential, since the ac current in $L_{AUX}$ is likely to be smaller than the ac current in $L_{MAIN}$. The primary to secondary turns ratio of $L_{AUX}$ is substantially higher than the primary to secondary turns ratio of $L_{MAIN}$ so that the voltage and power provided by $L_{AUX}$ is substantially smaller at all load levels than the voltage and power provided by $L_{MAIN}$. The voltage applied to $C_{PRI1}$ is nearly the same as the voltage applied to $C_{PRI2}$ and is mostly a function of the duty cycle and the load. The voltages of $C_{PRI1}$ and $C_{PRI2}$ are not identical because $D_{CLAMP}$ conducts for a part of the on time of $S_{MAIN}$. During the time that $S_{AUX}$ conducts the voltage applied to the primary winding of $L_{AUX}$ is larger than the voltage that is applied to the primary winding of $L_{MAIN}$ because $L_{MAIN}$ is connected in series with $L_{ZVS}$ and there is some voltage applied to $L_{ZVS}$ during the on time of $S_{AUX}$. The voltage applied to $L_{ZVS}$ during the on time of $S_{AUX}$ is a function of load current and increases with the load current so that for higher loads the voltage applied to the primary winding of $L_{AUX}$ is higher than the voltage applied to the primary winding of $L_{AUX}$ when the load is light. As a result the output voltage at the secondary of $L_{AUX}$ and the fraction of the output voltage and power provided by $L_{AUX}$ increases as the load increases. As the load increases the voltage that must be applied to $L_{ZVS}$ increases so that the duty cycle increases with load. One effect of the addition of $L_{AUX}$ is to decrease the duty cycle at all loads which enables the converter to provide higher power at any given duty cycle compared to a similar circuit that does not contain $L_{AUX}$.

Related Embodiments

Figure 13:
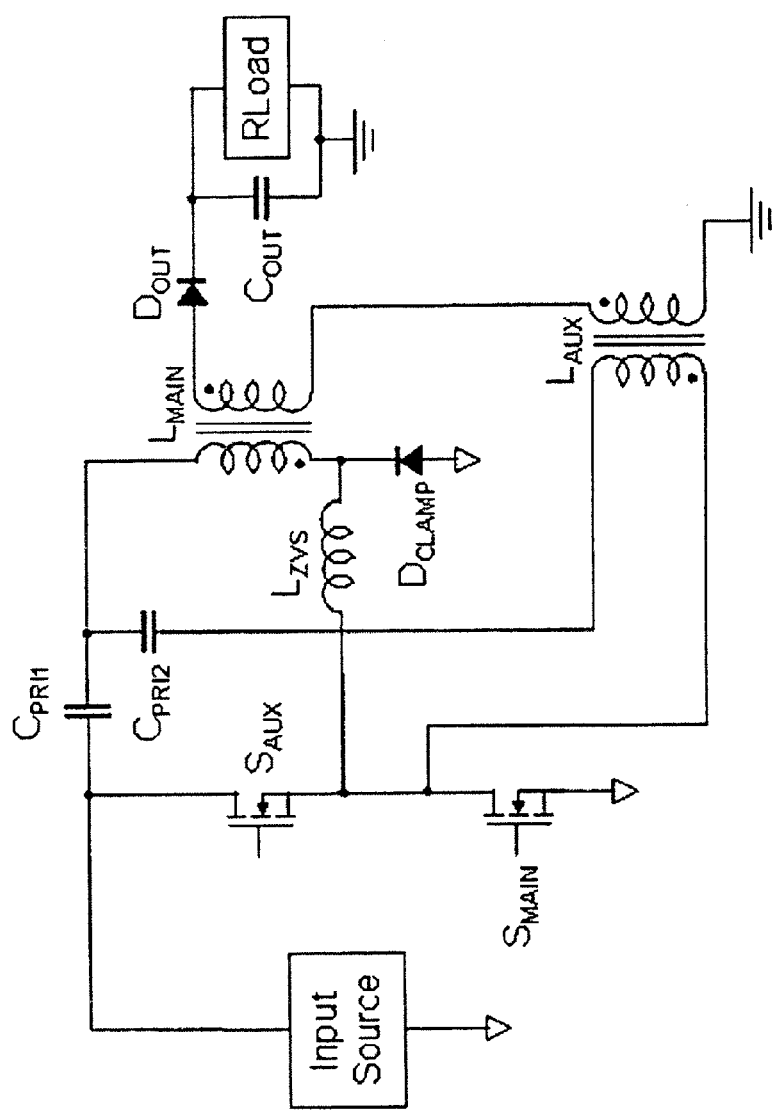
FIG. 13 illustrates an alternate arrangement of the FIG. 12 circuit that reduces the capacitor requirements according to the subject invention.

FIG. 13 illustrates a circuit identical to the FIG. 12 circuit, but with an alternate connection for capacitor $C_{PRI2}$. The connection of $C_{PRI2}$ in FIG. 13 results in a smaller applied voltage for $C_{PRI2}$ which can result in a large size and cost reduction for $C_{PRI2}$, compared to the connection illustrated in FIG. 12. The capacitor connection illustrated in FIG. 13 also increases the current in $C_{PRI1}$.

Figure 14:
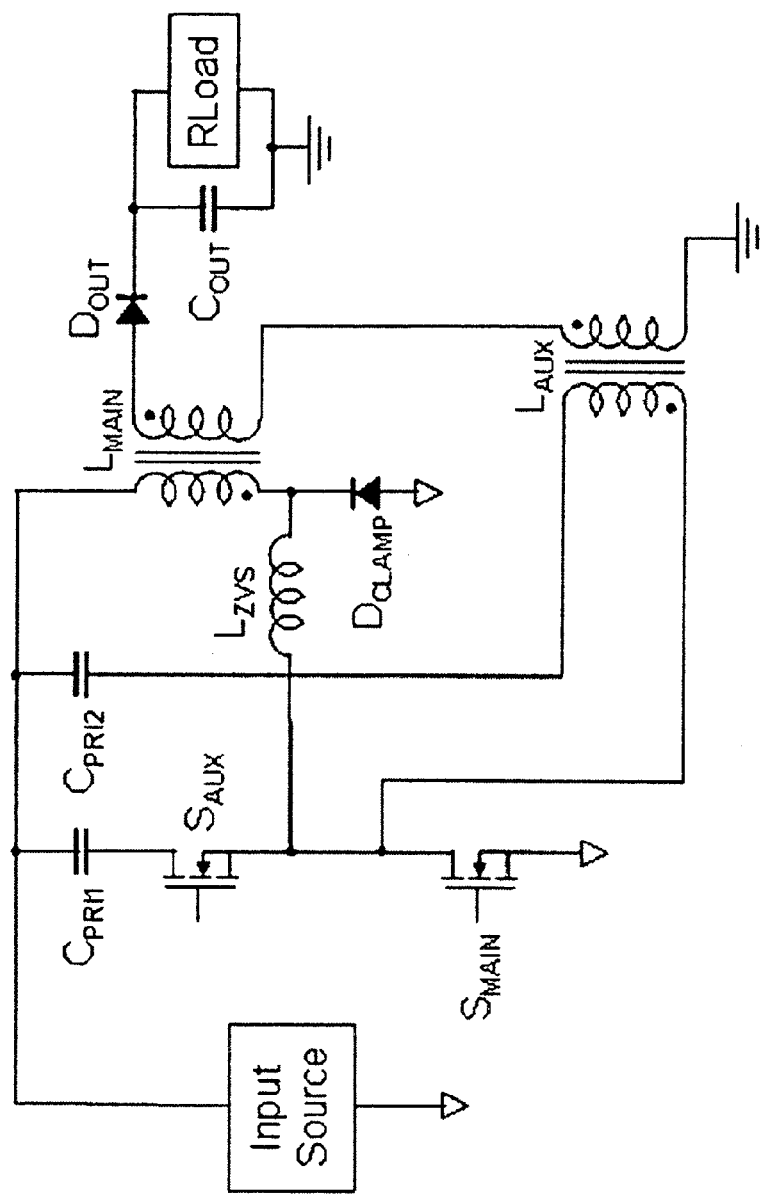
FIG. 14 illustrates how a small coupled inductor can be used to improve the ZVS load ranged and extend the maximum load capability of a ZVS active clamp flyback converter according to the subject invention.

FIG. 14 illustrates a ZVS active clamp flyback converter (U.S. Pat. No. 5,402,329, FIG. 12) according to the subject invention with the auxiliary choke $L_{AUX}$ added which permits wider ZVS load range, reduced duty cycle, and higher power handling capability compared to a ZVS active clamp flyback converter without $L_{AUX}$.

The auxiliary choke of the subject invention can also be used for synchronous rectifier gate drive, as illustrated in FIG. 8.

CONCLUSION, RAMIFICATIONS, AND SCOPE OF INVENTION

Thus the reader will see that the small capacitor connected at its first terminal to the drain terminal of a power mosfet when connected at its second terminal to an inverting switch such as an NPN transistor or N channel mosfet can prevent inadvertent turn on of the power mosfet during a turn off transition of the power mosfet. The reader will also see that an auxiliary choke coupled to the junction of two switches operating in anti-synchronization in a ZVS power converter can be used as a gate drive signal for a synchronous rectifier and as a mechanism to extend the light load ZVS range of the power converter, and that a secondary winding of the auxiliary choke, connected as described, can also or alternatively be used to reduce the power provided through the main power path and can reduce the duty cycle of the converter and extend its maximum load range.

While my above description contains many specificities, these should not be construed as limitations on the scope of the invention, but rather, as exemplifications or preferred embodiments thereof. Many other variations are possible.

For example, converters that use P channel synchronous rectifiers or IGBT synchronous rectifiers are possible, and these synchronous rectifiers could benefit from the circuits and methods revealed herein. Synchronous rectifier self gate drive for other types of ZVS converters or ZVS cells not illustrated herein, but that rely on a small choke to drive ZVS transitions are also possible by using the structures and methods described herein. Accordingly, the scope of the invention should be determined not by the embodiments illustrated, but by the appended claims and their legal equivalents.

I claim:

1. A power mosfet gate voltage clamping circuit comprising,
   a first capacitor having first and second terminals with said first terminal of said first capacitor connected to a drain terminal of said power mosfet,
   inverting switch means having a control terminal, a first output terminal, and a second output terminal with said control terminal of said inverting switch means connected to said second terminal of said first capacitor, said first output terminal of said inverting switch means coupled to a gate terminal of said power mosfet, and with said second output terminal of said inverting switch means coupled to a source terminal of said power mosfet,
   whereby an increase of drain to source voltage during a turn off transition of said power mosfet results in a current in said first capacitor resulting in the turn on of said inverting switch means and the clamping of the gate voltage of said power mosfet thereby preventing the turn on of said power mosfet during said turn off transition due to the current in an intrinsic gate drain capacitance of said power mosfet.

2. A power mosfet gate voltage clamping circuit as set forth in claim 1 wherein said inverting switch means is a bipolar transistor.

3. A power mosfet gate voltage clamping circuit as set forth in claim 1 wherein said inverting switch means is a darlington bipolar transistor.

4. A power mosfet gate voltage clamping circuit as set forth in claim 1 wherein said inverting switch means is a field effect transistor.

5. A power mosfet gate voltage clamping circuit as set forth in claim 1 wherein said inverting switch means comprises inverting integrated circuit means.

6. A power mosfet gate voltage clamping circuit as set forth in claim 1 wherein said first capacitor is the intrinsic capacitance of a field effect transistor mosfet with its gate terminal connected to its source terminal.

7. A power mosfet gate voltage clamping circuit as set forth in claim 1 further comprising,
   a second capacitor connected in series between said second output terminal of said inverting switch means and said source terminal of said power mosfet,
   a rectifier diode having an anode terminal and a cathode terminal connected so that said second capacitor is charged to an off state gate voltage of said power mosfet,
   whereby said inverting switch clamps the voltage of said gate terminal of said power mosfet to said off state gate voltage of said power mosfet during said turn off transition of said power mosfet.

8. A synchronous rectifier self gate drive circuit comprising,
   first switch means having first and second terminals,
   second switch means having first and second terminals operable substantially in anti-synchronization to said first switch means with said first terminal of said first switch means coupled to said second terminal of said second switch means,
   a first coupled inductor having a primary winding and a first secondary winding with said primary winding of said first coupled inductor coupled to said first terminal of said first switch means and with said first secondary winding of said first coupled inductor coupled to a gate terminal of said synchronous rectifier,
   a first capacitor coupled to said primary winding of said first coupled inductor,
   whereby timing information and energy is transferred through said first coupled inductor to said gate terminal of said synchronous rectifier to cause the turn on and turn off of said synchronous rectifier at times appropriate for efficient and reliable operation of said synchronous rectifier.

9. A synchronous rectifier self gate drive circuit as set forth in claim 8 comprising instead of a first coupled inductor having a primary winding and a first secondary winding,
   a first coupled inductor having a primary winding, a first secondary winding, and a second secondary winding with said primary winding of said first coupled inductor coupled to said first terminal of said first switch means, with said first secondary winding of said first coupled inductor coupled to said gate terminal of said synchronous rectifier, and with said second secondary winding of said first coupled inductor connected in series with a channel of said synchronous rectifier,
   whereby said second secondary winding of said first coupled inductor contributes voltage and power to an output of a power converter containing said switch means and said synchronous rectifier, thereby reducing the duty cycle of said power converter and increasing the maximum load capability of said power converter.

10. A power converter comprising,
    an input coupleable to a source of dc potential,
    an output coupleable to a dc load,
    a first coupled inductor with substantial dc energy storage capability having a primary winding coupled to said input and a secondary winding coupled to said output,
    a second inductor connected in series with said first coupled inductor,
    a third coupled inductor with substantial dc energy storage capability having a primary winding connected in parallel with said primary winding of said first coupled inductor and a secondary winding connected in series with said secondary winding of said first coupled inductor, having a substantially larger primary to secondary turns ratio than said first coupled inductor thereby providing a small fraction of said power converter's output voltage and output power,
    a first capacitor coupled to said input and said primary winding of said first coupled inductor,
    a second capacitor coupled to said secondary winding of said first coupled inductor and said output,
    a third capacitor coupled to said primary winding of said third coupled inductor and to said input,
    first switch means for coupling said first capacitor and said third capacitor to said primary windings for exchanging stored energy between said first and third capacitors and said first and third coupled inductors, second switch means operable substantially in synchronization with said first switch means and coupled to said secondary windings for applying at least a portion of said exchanged energy to said dc load, third switch means operable for coupling said primary windings to said source of dc potential alternately and sequentially with the operation of said first and second switch means, so that said first and third capacitors exchange energy with said primary windings when said first switch means is activated, and said second capacitor exchanges energy with said secondary windings when said second switch means is activated, whereby said second inductor contributes energy to the turn on transition of said third switch means and said third coupled inductor contributes a small fraction of the output voltage and output power of said converter thereby reducing the duty cycle of said third switch means and increasing the maximum power capability of said power converter.

11. A power converter as set forth in claim 10, wherein said first capacitor is connected in series with said primary winding of said first coupled inductor.

12. A power converter as set forth in claim 11, wherein said third capacitor is coupled to said input through said first capacitor.

13. A power converter as set forth in claim 10, wherein said first capacitor is connected in series with said first switch means.

14. A power converter as set forth in claim 10, wherein said first, second, and third switch means comprise semiconductor switch means.

15. A power converter as set forth in claim 14, wherein said first and third switch means comprise field effect transistors.

16. A power converter as set forth in claim 15, wherein said second switch means comprises a field effect transistor.

17. A power converter as set forth in claim 15, wherein said second switch means comprises a semiconductor rectifier diode.

18. A power converter as set forth in claim 10, further comprising, a rectifier diode having an anode terminal and a cathode terminal with one terminal of said rectifier diode connected to said second inductor and said primary winding of said first coupled inductor, and with the other terminal of said rectifier diode connected to said input, whereby said rectifier diode is oriented so as to conduct and to clamp the voltage at the terminal of said rectifier diode connected to said second inductor during the on time of said third switch means, thereby eliminating ringing associated with the inductor capacitor circuit formed by said second inductor and intrinsic capacitance associated with said second switch means.

* * * * *